US009203329B2

(12) United States Patent
Nakamura et al.

(10) Patent No.: US 9,203,329 B2
(45) Date of Patent: Dec. 1, 2015

(54) MOTOR DRIVE CONTROL SYSTEM

(71) Applicant: Mitsubishi Electric Corporation, Chiyoda-ku, Tokyo (JP)

(72) Inventors: Ryo Nakamura, Chiyoda-ku (JP); Hanako Kubota, Chiyoda-ku (JP); Kazuhiro Nishiwaki, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 55 days.

(21) Appl. No.: 14/153,435

(22) Filed: Jan. 13, 2014

(65) Prior Publication Data
US 2014/0306629 A1    Oct. 16, 2014

(30) Foreign Application Priority Data

Apr. 12, 2013 (JP) ................................ 2013-083504

(51) Int. Cl.
*H02P 1/04* (2006.01)
*H02P 6/00* (2006.01)
*H02P 27/08* (2006.01)
*H02P 21/06* (2006.01)

(52) U.S. Cl.
CPC ................ *H02P 6/002* (2013.01); *H02P 21/06* (2013.01); *H02P 27/085* (2013.01)

(58) Field of Classification Search
CPC ....... H02P 27/08; H02P 21/0021; H02P 6/08; H02P 27/085; H02P 27/06; H02P 2209/13; H02P 6/181; H02P 2209/11; H02P 23/0027; H02P 29/0044
USPC ............ 318/400.17, 400.02, 400.2, 722, 432, 318/599, 471, 472
See application file for complete search history.

(56) References Cited

U.S. PATENT DOCUMENTS

| 5,652,495 A * | 7/1997 | Narazaki et al. ............... 318/716 |
| 6,734,649 B1 * | 5/2004 | Sardar ........................... 318/609 |

(Continued)

FOREIGN PATENT DOCUMENTS

| JP | 2005-218299 A | 8/2005 |
| JP | 2011-223718 A | 11/2011 |
| JP | 2012-095390 A | 5/2012 |

OTHER PUBLICATIONS

Japanese Office Action issued Apr. 30, 2014 in corresponding Patent Application No. 2013-083504 with Partial English Translation.

*Primary Examiner* — Bentsu Ro
*Assistant Examiner* — Thai Dinh
(74) *Attorney, Agent, or Firm* — Sughrue Mion, PLLC; Richard C. Turner

(57) ABSTRACT

Included are: a voltage command generation unit which generates a voltage command amplitude and a voltage command phase based on a current command value; a phase generation unit during rectangular wave energization, which generates a voltage command phase during rectangular wave energization; and a control switching determination unit which switches by determining as to which control of PWM energization or rectangular wave energization will be performed depending on the amount of the condition of a motor. A switching device unit is driven by the output from a PWM energization unit when switched to the PWM energization; and the switching device unit is driven by the output from a rectangular wave energization unit when switched to the rectangular wave energization. The voltage command generation unit calculates the voltage command amplitude and the voltage command phase by using parameters of the motor.

7 Claims, 3 Drawing Sheets

(56) References Cited

U.S. PATENT DOCUMENTS

| | | | |
|---|---|---|---|
| 7,859,209 B2 * | 12/2010 | Iwaji et al. | 318/400.23 |
| 8,269,439 B2 * | 9/2012 | Itoh | 318/400.09 |
| 8,884,567 B2 * | 11/2014 | Senkou et al. | 318/434 |
| 9,071,179 B2 * | 6/2015 | Ishikawa | 1/1 |
| 2005/0046369 A1 * | 3/2005 | Kobayashi et al. | 318/432 |
| 2009/0284202 A1 * | 11/2009 | Miura | 318/473 |

* cited by examiner

MOTOR DRIVE CONTROL SYSTEM

BACKGROUND OF THE INVENTION

1. Field of the Invention

The present invention relates to a motor drive control system which performs drive control of a motor and, more particularly, relates to a motor drive control system which is for switching rectangular wave energization and PWM energization depending on the drive condition of a motor.

2. Description of the Related Art

A motor drive control system (hereinafter, referred to as an "inverter") is arranged in order to generate an alternating current (AC) voltage and an AC current for driving an electric motor (motor) by means of a DC power supply. The inverter is arranged with a plurality of switching devices, generates the AC voltage and the AC current by controlling an energization sequence of the switching devices, and controls the amplitude of the AC voltage and the AC current by controlling an energization time of the switching devices. An energization method of the switching devices generally includes pulse width modulation energization (hereinafter, referred to as "PWM energization") and rectangular wave energization.

The PWM energization is the energization method which changes ON time of the switching devices to control the magnitude of output voltage and can easily control the output voltage; and therefore, the PWM energization has an advantage capable of stably rotating even at low rotation. However, the voltage amplitude capable of outputting by PWM energization is restricted; and accordingly, a problem exists that the motor cannot be driven at high rotation.

On the other hand, the rectangular wave energization is the energization method which makes the switching devices ON by a half cycle of one cycle in electrical angle and can increase the output voltage as compared to the PWM energization; and therefore, it becomes possible to make the motor drive at high rotation. Further, switching of the switching devices is performed only two times at one cycle in electrical angle; and therefore, the rectangular wave energization has an advantage in which the number of switching of the switching devices is smaller than that of the PWM energization and switching loss is reduced to be able to increase inverter efficiency. However, ON time of the switching devices cannot be freely changed; and accordingly, a problem exists that control of the output voltage is difficult.

For example, JP2005-218299A proposes a technique in which an actual current amplitude and an actual current phase to be energized to the motor are detected by a current sensor; a voltage amplitude and a voltage phase are calculated by using the detected value; a selection is made as to which control of the rectangular wave energization or the PWM energization will be performed to drive the motor in consideration of a torque command value, a direct current (DC) voltage, and the calculated voltage amplitude and voltage phase; and the motor is driven efficiently from low speed to high speed.

However, according to the technique disclosed in Patent Document 1, the current sensor which is for detecting the AC current to be energized to the motor has to be arranged in a harness connected between the motor and the inverter. Accordingly, motor output is lowered due to electric power loss of the harness. Furthermore, if the current sensor is brought down, switching determination of the PWM energization and the rectangular wave energization cannot be performed; and accordingly, a problem exists in that the motor cannot be stably driven during the breakdown of the current sensor.

BRIEF SUMMARY OF THE INVENTION

The present invention has been made to solve the above described problem, and an object of the present invention is to provide a motor drive control system capable of driving a motor stably from low speed to high speed by perform switching control of PWM energization and rectangular wave energization without using a current sensor which detects an AC current to be energized to the motor.

According to the present invention, there is provided a motor drive control system including: a voltage command generation unit which generates a voltage command amplitude and a voltage command phase based on a current command value; a phase generation unit during rectangular wave energization which generates a voltage command phase during rectangular wave energization; a control switching determination unit which switches by determining as to either the control of PWM energization or rectangular wave energization will be performed depending on the amount of the condition of a motor or the motor drive control system; a PWM energization unit which outputs a PWM waveform depending on the voltage command amplitude and the voltage command phase generated by the voltage command generation unit; a rectangular wave energization unit which outputs a rectangular wave depending on the voltage command phase generated by the phase generation unit during rectangular wave energization; and a switching device unit which performs switching operation according to the output of the PWM energization unit or the rectangular wave energization unit. The voltage command generation unit calculates the voltage command amplitude and the voltage command phase by using parameters of the motor.

According to the motor drive control system of the present invention, the PWM energization and the rectangular wave energization can be switched without using a current sensor that detects a current to be energized to a motor and it becomes possible to drive the motor efficiently from low speed to high speed.

DETAILED DESCRIPTION OF THE INVENTION

Embodiment 1

Hereinafter, a motor drive control system in Embodiment 1 of the present invention will be described with reference to drawings.

Figure 1:
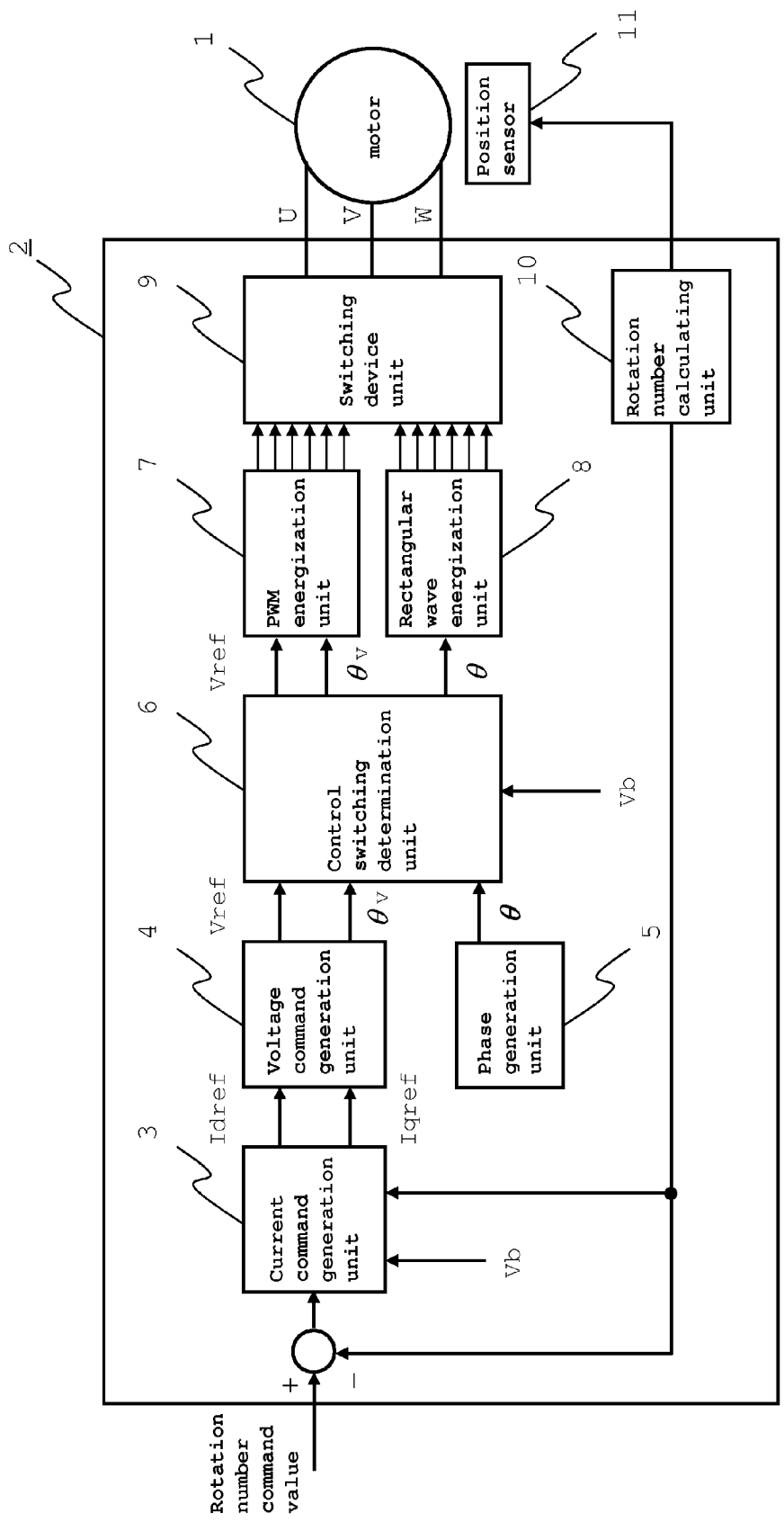
FIG. 1 is a system configuration diagram of a motor drive control system according to Embodiment 1 of the present invention.

FIG. 1 is a system configuration diagram of the motor drive control system according to Embodiment 1 of the present invention.

In FIG. 1, a motor 1 is a three phase motor and is connected to a motor drive control system (hereinafter, referred to as an "inverter") 2 by using three harnesses of U phase, V phase, and W phase; however, the number of connections between the motor 1 and the inverter 2 is not particularly limited. Furthermore, the connection between the motor 1 and the inverter 2 is made by the harnesses; however, the harnesses may not be used, what is called, the motor 1 and the inverter 2 may be integrally configured.

Incidentally, the motor 1 in this embodiment is a synchronous motor in which a rotor rotates at the same speed as a rotating magnetic field; however, a type of the motor 1 is not particularly limited.

The inverter 2 includes: a rotation number calculating unit 10 which calculates the rotation number of the motor 1 from the output of a position sensor 11 arranged on the motor 1; a current command generation unit 3 which generates a current command value according to the difference between the output of the rotation number calculating unit 10 and a rotation number command value; a voltage command generation unit 4 which generates a voltage command amplitude Vref and a voltage command phase θv from a d axis current command value Idref and a q axis current command value Iqref, which are output from the current command generation unit 3; a phase generation unit during rectangular wave energization 5 which generates a voltage command phase θ during rectangular wave energization; a control switching determination unit 6 which switches by determining as to which control of PWM energization or rectangular wave energization will be performed depending on a DC voltage Vb to be applied to the inverter 2; a PWM energization unit 7 which generates a switching waveform during PWM energization; a rectangular wave energization unit 8 which generates a switching waveform during rectangular wave energization; and a switching device unit 9 composed of switching devices, such as a metal oxide semiconductor field effect transistor (MOSFET) and an insulated gate bipolar transistor (IGBT).

The current command generation unit 3 generates the d axis current command value and the q axis current command value according to the difference between the rotation number command value corresponding to an accelerator opening degree or the like and the motor rotation number calculated by the rotation number calculating unit 10. The current command value generated by only the difference between the rotation number command value and the motor rotation number is likely to exceed a command value capable of outputting by the inverter 2. If a value exceeding the current command value capable of outputting by the inverter 2 is set, there is a possibility to destroy the inverter 2; and therefore, the d axis current command value Idref and the q axis current command value Iqref are output by putting a restriction on the current command value.

Incidentally, as a method of putting the restriction on the current command value, a current limiting value capable of outputting by the inverter 2 may be calculated from the DC voltage Vb applied to the inverter 2 and the rotation number of the motor 1, or a map which calculates the current limiting value from the DC voltage Vb and the rotation number of the motor 1 may be used.

The voltage command generation unit 4 calculates the voltage command amplitude Vref and the voltage command phase θv from the d axis current command value Idref and the q axis current command value Iqref. In order to calculate the voltage command amplitude Vref, first, a d axis voltage command value Vdref and a q axis voltage command value Vqref are calculated from the d axis current command value Idref and the q axis current command value Iqref. These are calculated by using equation (1) and equation (2).

$$Vdref = Rdq \times Idref - \omega \times Ldq \times Iqref \quad (1)$$

$$Vqref = \omega \times Ldq \times Idref + Rdq \times Iqref + \omega \times \phi dq \quad (2)$$

where, Rdq is a d-q axis resistance value of the motor 1, ω is a rotary electric angular frequency of the motor 1, and Ldq is a d-q axis inductance value of the motor 1.

Next, the voltage command amplitude Vref is calculated. The voltage command amplitude Vref is calculated by equation (3) by using the d axis voltage command value Vdref and the q axis voltage command value Vqref.

$$Vref = \sqrt{(Vdref \times Vdref + Vqref \times Vqref)} \quad (3)$$

Figure 2:
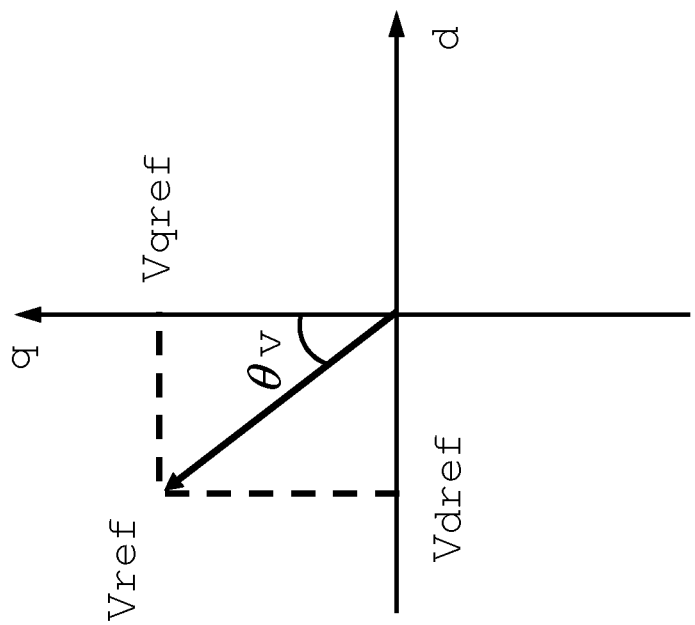
FIG. 2 is a vector diagram of a voltage phase command of a voltage command generation unit for use in the motor drive control system according to Embodiment 1 of the present invention.

Next, the voltage command phase θv is calculated. FIG. 2 shows a vector diagram of the voltage command phase θv. The voltage command phase θv is calculated by equation (4) by using the d axis voltage command value Vdref and the q axis voltage command value Vqref.

$$\theta v = \arctan(-Vdref/Vqref) \quad (4)$$

As described above, the voltage command generation unit 4 calculates the voltage command amplitude Vref and the voltage command phase θv by using parameters of the motor 1, such as the d-q axis resistance value, the rotary electric angular frequency, and the d-q axis inductance value of the motor 1.

The phase generation unit during rectangular wave energization 5 calculates the voltage command phase θ which is used during rectangular wave energization. The reason why the voltage command phase θ of the rectangular wave energization is calculated is that in the case of switching from the PWM energization to the rectangular wave energization, the voltage amplitude changes between those output by the PWM energization and by the rectangular wave energization; and therefore, if the rectangular wave energization is performed by using the voltage command phase θv during PWM energization, the voltage fluctuates in the case of changing to the rectangular wave energization.

For this reason, in the case of switching from the PWM energization to the rectangular wave energization, the voltage command phase θ of the rectangular wave energization needs to be set so that the voltage amplitude continuously changes.

Incidentally, as the method of calculating the voltage command phase θ which is used during the rectangular wave energization, a map which calculates the voltage command phase θ during the rectangular wave energization may be used by using the voltage command amplitude Vref and the voltage command phase θv during the PWM energization, or the voltage command phase θ may be calculated from the calculation equation which uses the voltage command amplitude Vref and the voltage command phase θv during the PWM energization.

The control switching determination unit 6 switches by determining as to either the control of PWM energization or rectangular wave energization will be performed depending on the amount of the condition of the motor 1 or the inverter 2. As the amount of the condition by which the PWM energization and the rectangular wave energization are switched, the DC voltage to be applied to the inverter 2 and the voltage command amplitude Vref from the voltage command generation unit 4 or the voltage command phase θ from the phase generation unit during rectangular wave energization 5 is used.

More specifically, the control switching determination unit 6 switches the energization system by determining as to which control of the PWM energization or the rectangular wave energization will be performed depending on the voltage command amplitude Vref or the phase of the voltage command phase θ.

Figure 3:
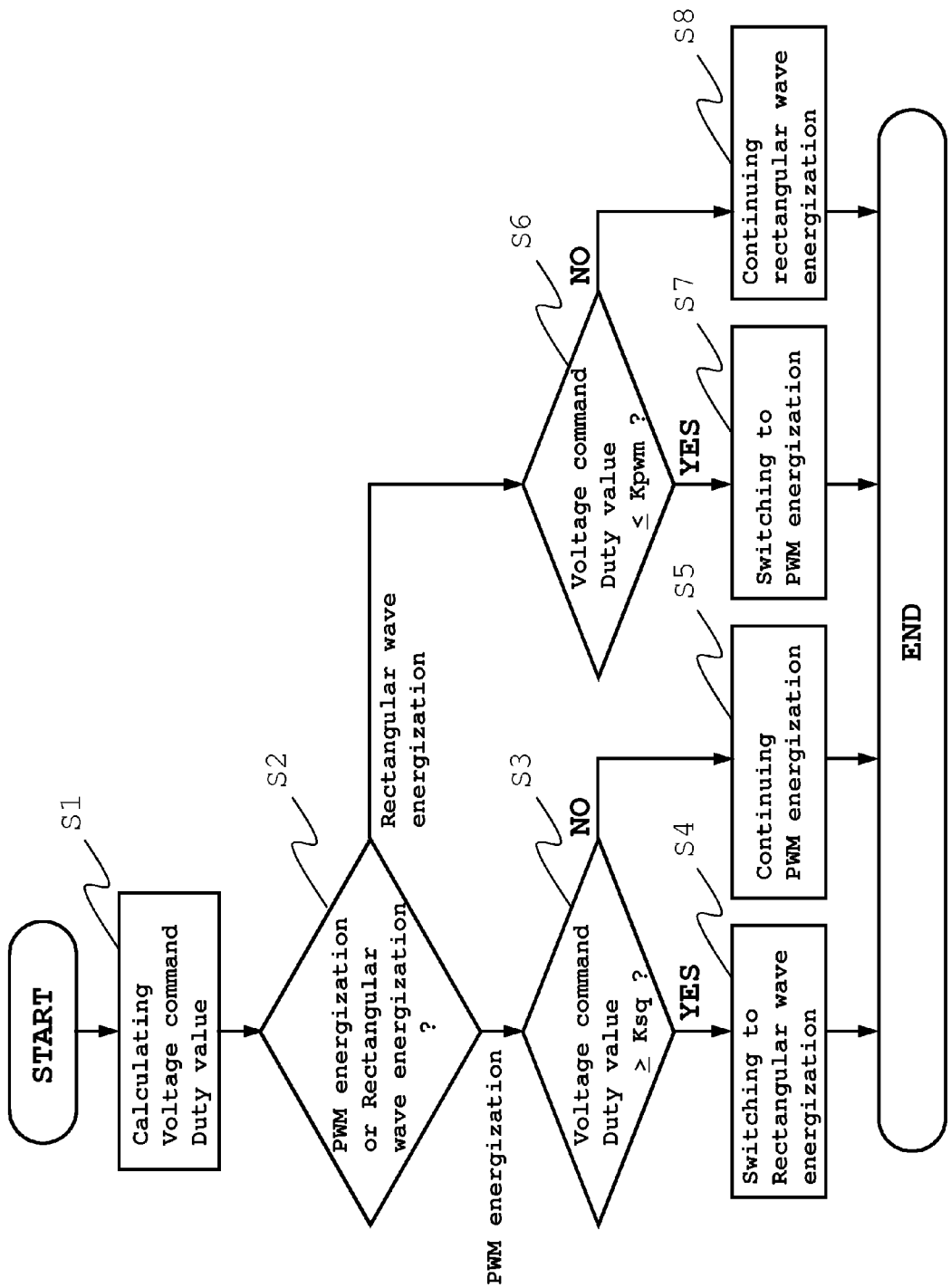
FIG. 3 is a flow chart diagram showing the operation of a control switching determination unit for use in the motor drive control system according to Embodiment 1 of the present invention.

The operation of the control switching determination unit 6 will be described with reference to a flowchart of FIG. 3. FIG. 3 includes steps from S1 to S8 in the process from START to END.

First, in step S1, a voltage command Duty value is calculated. The voltage command Duty value is represented by the ratio of the voltage amplitude command Vref during PWM energization and a maximum voltage value capable of outputting by the rectangular wave energization (determined by the DC voltage Vb to be applied to the motor drive control system 2) and is calculated by equation (5).

$$\text{Voltage command Duty value} = Vref/(Vb \times \sqrt{(6/\pi)}) \quad (5)$$

In the next step S2, a determination is made whether the present energization condition is either the PWM energization or the rectangular wave energization. If the determination is made that the present energization condition is the PWM energization, the process proceeds to step S3; and if the determination is made that the present energization condition is the rectangular wave energization, the process proceeds to step S6. The detail of the operation of step S6 will be described later.

In the next step S3, a determination is made as to whether the voltage command Duty value is equal to or higher than a rectangular wave switching threshold value Ksq. If a determination (YES) is made that the voltage command Duty value is equal to or higher than Ksq (voltage command Duty value≥Ksq), the process proceeds to step S4. If a determination (NO) is made that the voltage command Duty value is lower than Ksq (voltage command Duty value<Ksq), the process proceeds to step S5; and the PWM energization condition is continued and a control switching determination process is terminated.

Incidentally, the rectangular wave switching threshold value Ksq is calculated by equation (6).

$$\text{Rectangular wave switching threshold value } Ksq = ks \, (Vb \times \sqrt{(6/\pi)}) \quad (6)$$

where, ks is a rectangular wave switching adjustment coefficient and is a range from 0 to 1.

In the next step S4, a determination is made that the energization condition needs to be switched from the PWM energization to the rectangular wave energization, the output of the control switching determination unit 6 is switched from the PWM energization to the rectangular wave energization, and the control switching determination process is terminated.

Furthermore, in step S2, if a determination is made that the present condition is the rectangular wave energization, the process proceeds to the next step S6. In step S6, a determination is made as to whether the voltage command Duty value is equal to or lower than a PWM switching threshold value Kpwm. If a determination (YES) is made that the voltage command Duty value is equal to or lower than the PWM switching threshold value Kpwm, the process proceeds to step S7. If a determination (NO) is made that the voltage command Duty value is higher than the PWM switching threshold value Kpwm, the process proceeds to step S8, the rectangular wave energization is continued, and the control switching determination process is terminated.

Incidentally, the PWM switching threshold value Kpwm is calculated by equation (7).

$$PWM \text{ switching threshold value } Kpwm = kp \times Vb \times \sqrt{(6/\pi)} \quad (7)$$

where, kp is a PWM energization switching adjustment coefficient and is a range from 0 to 1.

Incidentally, the rectangular wave switching threshold value Ksq and the PWM switching threshold value Kpwm are set so as to constantly establish a relationship of Ksq≥Kpwm.

In the next step S7, a determination is made that the energization condition needs to be switched from the rectangular wave energization to the PWM energization, the output of the control switching determination unit 6 is switched from the rectangular wave energization to the PWM energization, and the control switching determination process is terminated.

As described above, the control switching determination unit 6 switches by determining as to either the control of the PWM energization or the rectangular wave energization will be performed depending on the amount of the condition of the motor 1 or the motor drive control system 2.

More specifically, as the amount of the condition by which the PWM energization and the rectangular wave energization are switched, the voltage command Duty value is used; and the voltage command Duty value is determined by the voltage amplitude command Vref and the DC voltage Vb to be applied to the motor drive control system 2.

In the case where a determination is made that a determination result by the control switching determination unit 6 is the PWM energization, the PWM energization unit 7 generates a PWM signal corresponding to the voltage command amplitude Vref and the voltage command phase θv calculated by the voltage command generation unit 4 and outputs the PWM signal to the switching device unit 9.

In the case where a determination is made that the determination result by the control switching determination unit 6 is the rectangular wave energization, the rectangular wave energization unit 8 generates a signal corresponding to the voltage command phase θ from the phase generation unit during rectangular wave energization 5 and outputs the signal to the switching device unit 9.

Then, the motor 1 is made to be stably driven from low speed to high speed by a signal (AC voltage) from the switching device unit 9.

As described above, the motor drive control system 2 includes the voltage command generation unit 4 which generates the voltage commands by using the parameters of the motor 1 and the control switching determination unit 6 which switches the PWM energization and the rectangular wave energization depending on the amount of the condition of the motor 1; and thus, it becomes possible to stably drive the motor from low speed to high speed by selecting as to which energization of the PWM energization or the rectangular wave energization will be performed without using a current sensor which detects a current to be energized to the motor 1.

Embodiment 2

The DC voltage Vb to be applied to the motor drive control system 2 and the voltage command value Vref during PWM energization are used as the amount of the condition of the motor 1 by which the PWM energization and the rectangular wave energization are switched in the control switching determination unit 6 in Embodiment 1; however, in the present invention of Embodiment 2, switching control is performed by using a voltage command phase θ during rectangular wave energization as the amount of the condition of a motor 1 in a control switching determination unit 6.

In the case where the switching control is performed by using the voltage command phase θ during rectangular wave energization, if the voltage command phase θ of rectangular wave energization is equal to or lower than a PWM energization switching voltage phase θpwm during rectangular wave energization, the switching is made to the PWM energization.

The PWM energization switching voltage phase θpwm is calculated by equation (8) by using a voltage command phase maximum value θmax and a PWM energization switching voltage phase coefficient Kθpwm during rectangular wave energization.

$$\text{PWM energization switching voltage phase}\\ \theta pwm = K\theta pwm \times \theta max \quad (8)$$

where, Kθpwm is the PWM energization switching voltage phase coefficient and is a range from 0 to 1.

As described above, the switching from the rectangular wave energization to the PWM energization is performed when the rectangular wave voltage command phase θ is equal to or lower than a predetermined value. The reason is as follows.

When the motor becomes high rotation, an inverter output voltage is increased; and if the voltage is saturated, the rotation number of the motor cannot be increased. In order to prevent this, a negative current is made to flow in a d axis current Id and thus magnetic flux of the motor is attenuated to perform attenuation magnetic flux which reduces the voltage saturation. When the negative current is increased, that is, when the attenuation magnetic flux is enhanced, a voltage phase becomes large by equations (1), (2), and (4); and when the attenuation magnetic flux is attenuated, the voltage phase is reduced. The switching from the rectangular wave energization to the PWM energization is performed in a region in which the voltage is not saturated; and therefore, if the rectangular wave voltage command phase θ is equal to or lower than the predetermined value, the switching is made.

It is, therefore, even the voltage command phase θ during rectangular wave energization is used as the amount of the condition of the motor 1, by which switching is made from the rectangular wave energization to the PWM energization in the control switching determination unit 6, similar effects as the voltage command value Vref during the PWM energization can be obtained.

Embodiment 3

Embodiment 1 does not particularly make reference to the setting of the rectangular wave switching threshold value Ksq at which switching is made from the PWM energization to the rectangular wave energization and the PWM switching threshold value Kpwm at which switching is made from the rectangular wave energization to the PWM energization in the control switching determination unit 6; however, in the present invention of Embodiment 3, the above mentioned two switching threshold values are set to be different (have hysteresis characteristics).

More specifically, a rectangular wave switching threshold value Ksq at which switching is made from PWM energization to rectangular wave energization and a PWM switching threshold value Kpwm at which switching is made from the rectangular wave energization to the PWM energization in a control switching determination unit 6 are set to be different; and thus, it becomes possible to prevent frequent control switching of the PWM energization and the rectangular wave energization and to achieve stable driving of a motor 1.

Incidentally, the rectangular wave energization is performed in a region of high output voltage and the PWM energization is performed in a region of low output voltage; and therefore, when the rectangular wave switching threshold value Ksp is compared to the PWM switching threshold value Kpwm, both of the switching threshold values are set so as to constantly establish a relationship of Ksp≥Kpwm.

Embodiment 4

The present invention of Embodiment 4 includes a motor parameter correction unit in the voltage command generation unit 4 of Embodiment 1. The motor parameter correction unit corrects parameters of a motor 1 (a resistance value and an inductance value of the motor 1) depending on the temperature of the motor 1 and a motor drive control system 2.

More specifically, the voltage command generation unit 4 includes the motor parameter correction unit which corrects a d-q axis resistance value Rdq and a d-q axis inductance value Ldq of the motor 1 depending on the temperature of the motor 1 or the motor drive control system 2; corrected resistance value Rdq and inductance value Ldq of the motor 1 are substituted in equations (1) and (2) to calculate a voltage amplitude command Vref and a voltage phase command θv by equations (3) and (4); and thus, it becomes possible to calculate an exact voltage command value and it becomes possible to switch the PWM energization and the rectangular wave energization more appropriately.

Incidentally, a map corresponding to the temperature may be used for the calculation of the resistance value Rdq and the inductance value Ldq of the motor 1, or the calculation may be performed by using a calculation equation calculated from the temperature.

Embodiment 5

The difference between the output of the rotation number calculating unit 10 and the rotation number command value is input in the current command generation unit 3 in Embodiment 1; however, in the present invention of Embodiment 5, a torque calculation unit of a motor 1 is used in place of the rotation number calculating unit 10 and the difference between a torque command value and the output of the torque calculation unit is input in a current command generation unit 3. Similar effects as Embodiment 1 can be obtained even in such a configuration.

As described above, the present invention has been described with respect to some embodiments; however, the present invention is not limited to these embodiments and the respective embodiments can be freely combined and appropriately changed or omitted within the scope of the present invention.

DESCRIPTION OF REFERENCE NUMERALS

1: Electric motor (Motor),
2: Motor drive control system (Inverter),
3: Current command generation unit,
4: Voltage command generation unit,
5: Phase generation unit during rectangular wave energization,
6: Control switching determination unit,
7: PWM energization unit,
8: Rectangular wave energization unit,
9: Switching device unit,
10: Rotation number calculating unit,
11: Position sensor.

What is claimed is:

1. A motor drive control system comprising:
   a voltage command generation unit which generates a voltage command amplitude and a voltage command phase based on a current command value;
   a phase generation unit which generates a voltage command phase during rectangular wave energization;
   a control switching determination unit which switches by determining which of PWM energization or rectangular wave energization will be performed depending on an amount of a condition of a motor controlled by said motor drive control system and driven by an AC current, said determining being performed independently of said AC current;

a PWM energization unit which outputs a PWM waveform depending on the voltage command amplitude and the voltage command phase generated by said voltage command generation unit;

a rectangular wave energization unit which outputs a rectangular wave depending on the voltage command phase generated by said phase generation unit during rectangular wave energization; and a switching device unit which performs a switching operation according to the output of said PWM energization unit or said rectangular wave energization unit, said voltage command generation unit calculating the voltage command amplitude and the voltage command phase by using parameters of said motor.

2. The motor drive control system according to claim 1, wherein the parameters of said motor use a resistance value and an inductance value of said motor.

3. The motor drive control system according to claim 1, wherein the amount of the condition by which the PWM energization and the rectangular wave energization are switched in said control switching determination unit is based on a DC voltage to be applied to said motor drive control system.

4. The motor drive control system according to claim 1, wherein the amount of the condition by which the PWM energization and the rectangular wave energization are switched in said control switching determination unit is based on the voltage command amplitude of said voltage command generation unit or the voltage command phase of said phase generation unit during rectangular wave energization.

5. The motor drive control system according to claim 1, wherein said control switching determination unit sets a threshold value in the case of switching from the PWM energization to the rectangular wave energization to be a value different from a threshold value in the case of switching from the rectangular wave energization to the PWM energization.

6. The motor drive control system according to claim 5, wherein when the threshold value in the case of switch g from the PWM energization to the rectangular wave energization is a rectangular wave switching threshold value Ksp and the threshold value in the case of switching from the rectangular wave energization to the PWN energization is a PWM switching threshold value Kpwm, both of the switching threshold values are set so as to constantly establish a relationship of Ksp≥Kpwm.

7. The motor drive control system according to claim 1, wherein said voltage command generation unit corrects parameters of said motor depending on a temperature of said motor or said motor drive control system and calculates the voltage command amplitude and the voltage command phase by using the corrected motor parameters.

* * * * *